United States Patent [19]

Baixeras et al.

[11] 4,140,989

[45] Feb. 20, 1979

[54] TEMPERATURE SENSORS

[75] Inventors: Joseph Baixeras, Fontenay-aux-Roses; Paul Andro, Sevres, both of France

[73] Assignee: Agence Nationale de Valorisation de la Recherche (ANVAR), Neuilly-sur-Seine, France

[21] Appl. No.: 786,028

[22] Filed: Apr. 8, 1977

[30] Foreign Application Priority Data

Apr. 9, 1976 [FR] France .............................. 76 10454

[51] Int. Cl.$^2$ .............................................. H01C 7/00
[52] U.S. Cl. ................... 338/25; 204/192 F; 252/518; 252/521; 338/308; 338/309
[58] Field of Search .................................... 338/22-25, 338/307-309; 204/192 FR, 192 C; 427/102, 123-125; 242/512, 521, 518; 73/362 AR

[56] References Cited

U.S. PATENT DOCUMENTS

| | | | |
|---|---|---|---|
| 3,256,588 | 6/1966 | Sikina et al. | 427/125 X |
| 3,395,089 | 7/1968 | Mayer et al. | 204/192 FR |
| 3,537,891 | 11/1970 | Rairden | 204/192 FR X |
| 3,714,013 | 1/1973 | Rairden | 204/192 FR |
| 3,736,242 | 5/1973 | Schwartz et al. | 204/192 FR |

Primary Examiner—C. L. Albritton
Attorney, Agent, or Firm—Daniel M. Rosen

[57] ABSTRACT

A temperature sensor comprises a thin layer of niobium nitride with a dis-ordered structure deposited on a thermally conductive electrically insulating substrate and terminal electrical contacts. The layer of niobium nitride may be deposited by reactive cathodic sputtering on the electrically insulating substrate.

9 Claims, 3 Drawing Figures

TEMPERATURE SENSORS

BACKGROUND AND SUMMARY OF THE INVENTION

The present invention relates to temperature sensors having a resistance whose value varies with respect to the temperature and more particularly to those of these sensors which can be used from a few K up to the usual atmospheric temperatures.

Numerous temperature sensors are already known capable of being used at cryogenic temperatures. In particular, carbon resistors are used but their range of use is limited (about 1.5 to 30 K) and their sensitivity varies greatly in this range, which prohibits the use of one and the same sensor to cover the whole of this range. Germanium resistors can be used between some 0.1 K and 100 K, but their sensitivity is much variable in that temperature range, so that again it is necessary to use several sensors successively to obtain measurements throughout the range. Moreover, their thermal inertia is fairly high, they are sensitive to magnetic fields and their cost is high. Temperatures between about 20 and 300 K can be measured with platinum resistors. But their sensitivity is low and those probes which ensure a good reproducibility of results are costly. Finally, semi-conductor junction diodes (particularly gallium arsenide) can be used between about 2 K and 300 K. But their sensitivity is low and the law of variation of the resistance with respect to the temperature is complex. Their cost is high and they are sensitive to magnetic field.

Ceramic resistors have already been described which consist of a sintered mixture of niobium nitride and niobium carbide. Such resistors have been described as having a very small temperature coefficient (Chemical Abstracts, Vol. 81, No. 2, July 15, 1974, abstract No. 7596e) and consequently are not suitable for use as temperature sensors.

Last, the prior art teaches preparation of thin layers of oxides such as vanadium oxide having a low electric resistance on shapphire polycrystalline alumina, beryllium oxide or glass (French patent specification No. 2 219 606, corresponding to U.S. Ser. No. 335,651 of H. Keith Eastwood et al).

It is an object of the invention to provide an improved temperature sensor which can be used over a wide range of temperatures and which is not substantially sensitive to the magnetic field, whose cost and thermal inertia are low. It is another object of the invention to provide a temperature sensor whose sensitivity varies with temperature according to a relation which may be represented by a simple mathematic formula.

According to an aspect of the invention, a temperature sensor comprises a thin layer of niobium nitride with a disordered or disorganized structure deposited on a substrate which has a high thermal conductivity and is electrically insulating at the operational temperatures, said layer being provided with terminal electrical contacts.

The thickness of the layer will typically be between 1000 Angström and a few thousand Angström. The substrate will be chosen according to the range of temperature envisaged.

When the sensor is to be used in the range of cryogenic temperatures, a strip of synthetic sapphire can be advantageously used as substrate. At low temperatures, sapphire has a thermal conductivity of the same order as that of metals currently considered as excellent heat conductors. Beryllium oxide can also be used. The favourable properties of these different materials appear from a comparison of their thermal conductivity values at 4.2 K, which are as follows:

| | |
|---|---|
| copper of high purity | 70 W.cm$^{-1}$ . K$^{-1}$ |
| ordinary copper | 3 W.cm$^{-1}$ . K$^{-1}$ |
| sapphire (Al$_2$O$_3$) | 2 W.cm$^{-1}$ . K$^{-1}$ |
| beryllium oxide | intermediate between sapphire and copper |

Sapphire also has the advantage of retaining at ambiant atmospheric temperatures an acceptable thermal conductivity of about 0.2 W.cm$^{-1}$.K$^{-1}$, which can be compared to that of copper, of about 5 W.cm$^{-1}$.K$^{-1}$.

Any other material may be used which is a good electrical insulator, has a sufficient thermal conductivity and provides a substrate bondable to the layer. Among additional materials which may be envisaged, loaded glasses can be cited.

According to another aspect of the invention, a process for manufacturing a temperature sensor includes the step of depositing a thin layer of niobium nitride by reactive cathode sputtering on an electrically insulating substrate and providing it with thermal contacts.

The layer thus obtained has a resistance R whose variation with respect to the absolute temperature T can in most cases be represented with sufficient accuracy by a relation of the type:

$$R(T) = R_o \exp (T/T_o)^{-\frac{1}{4}}$$

over a wide range of temperatures.

The constant values $R_o$ and $T_o$ depend on the conditions of preparation, in particular on the temperature of the substrate at the time of deposition. In general, the deposition temperature is selected to obtain a compromise between a value which corresponds to a high sensitivity of the sensor (i.e. a rapid variation of the resistance with respect to the temperature), but at the cost of a high value of $R_o$, and a deposition temperature which corresponds to a lower resistance $R_o$, which makes the sensor less sensitive to outside interference.

Whatever the deposition conditions, a layer is obtained whose resistance R varies with temperature T according to a simple mathematical law over a wide range of temperatures. Over the whole of this range a "secondary" thermometer (i.e. a thermometer which is calibrated by reference with a standard thermometer) incorporating a sensor of the above type can be calibrated in a simple way for direct reading of the temperature by interpolation. This has a favourable effect on the cost, not only because of the economical character of the sensor itself but also because of the simplification of the device as a whole.

The invention will be better understood from a consideration of the following description of one embodiment of the invention.

SHORT DESCRIPTION OF THE DRAWINGS

DESCRIPTION OF PREFERRED EMBODIMENTS

Figure 1:
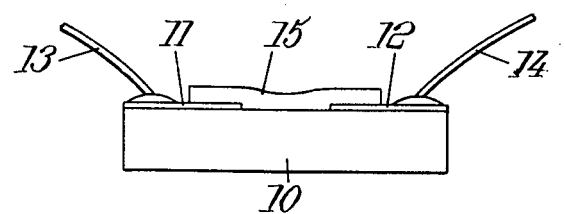
FIG. 1 is a sectional diagram of the sensor, the thickness being exaggerated for more clarity.

Referring to FIG. 1, there is shown a sensor which comprises a sapphire substrate 10 whose thickness is as small as possible (to reduce the thermal inertia of the sensor) to the extent compatible with satisfactory mechanical behaviour of the sensor. In practice, this thickness can hardly be less than about 0.2 mm. This substrate carries two terminal bands 11 and 12 of a very conductive metal serving as contacts. These bands are for example formed by deposition of gold layers of a thickness of about 1,000 Angström. To these layers are fixed, for example by thermo-welding, connection wires 13 and 14.

The sensor also comprises a sensitive element formed of a thin layer 15 of niobium nitride which bridges contacts 11 and 12. In practice, a layer of one thousand to ten thousand Angström thickness gives satisfactory results.

Due to the high resistivity of niobium nitride, a sensor for use after calibration is preferably shaped for the layer 15 to be elongated transversely to the current flow between contacts 11 and 12. In practice, a layer 15 having a width of 2 mm and a length of 5-6 mm can be used which permits to accomodate the sensor in a cylinder of 4 to 5 mm diameter and 10 mm length. It is also of advantage to increase the thickness of the layer so as to decrease the electrical resistance. But the increase is limited by the risk of resulting lack of homogeneity and "peeling" of the layer to about 10,000 Angströms.

Figure 2:
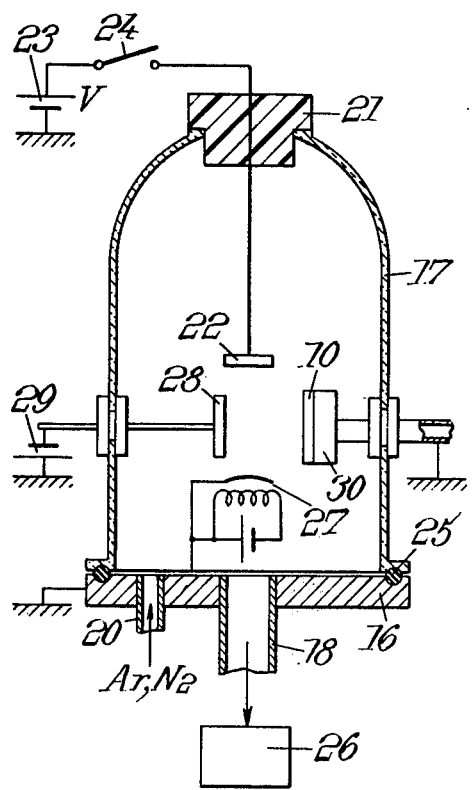
FIG. 2 is a schematic illustration of a device for depositing the layer of niobium nitride on the substrate.

The sensor may be constructed using reactive cathode sputtering in an apparatus of the type shown in FIG. 2. This apparatus comprises, on a base plate 16 of stainless steel, a containment bell 17. A sealing gasket 25 is located between the bell and plate. An evacuating unit 26 is connected by a duct 18 to the enclosure defined by the bell 17 and the base 16. This unit must be provided to create in the bell a vacuum which is of the order of $10^{-7}$ torr to evacuate and outgas the enclosure, then of the order of $10^{-3}$ torr during the deposition phase. In practice, the installation can comprise a primary blade pump and an oil diffusion pump. During manufacture of the sensor an atmosphere of nitrogen and an inert gas at low pressure (about 1 millitorr), such as Ar, is maintained in the enclosure. For this purpose, the enclosure is provided with an inlet tube 20 fitted with a bleed valve, not shown.

The cathode sputtering system shown in FIG. 2 has an electron emission filament 27 provided with heating means and connected to earth. Opposite filament 27, there is disposed an anode 22 connected by an electric line projecting through an insulating closure plug 21 to a source of DC voltage 23 which provides a positive voltage V with respect to earth when a switch 24 is closed. The voltage V and the distance between the filament and the anode 22 are chosen so that there is formed a column of plasma containing Ar+ ions between filament 27 and anode 22. In practice, this distance is about 20 cm and voltage V is from about 200 to about 300 volts.

A cathode 28, formed by a niobium plate, is placed near the plasma column so as to be impinged by positive ions formed in this column. Cathode 28 is carried by a rod which passes through bell 17 and is connected to a voltage source 29 which, in operation, provides a negative voltage of about $-1,000$ volts with respect to earth.

Finally, substrate 10, located to receive niobium nitride originating from the niobium torn from cathode 28, is placed on a support 30 opposite cathode 18. The support may be left free to assume a balance temperature or on the contrary may be provided with a piping for the circulation of a cooling agent (e.g. water or even a cryogenic fluid). Support 30 is typically connected to earth so that it does not become electrically charged. However, it can also be connected to a slightly positive voltage.

Manufacture process is then as follows: a substrate formed by a thin chip of sapphire 10 is carefully cleaned; then layers of gold are deposited on the lateral portions of its upper surface, e.g. by vacuum evaporation or spraying, while the central part of the surface of the substrate is protected with a mask. Obviously a mosaic of contacts can be provided on a same substrate of large surface so as to manufacture several sensors at one time. The substrate thus prepared is covered with another mask, possibly prepared by photoetching, leaving only a window corresponding to the size of the layer 15 (or layers) of niobium nitride to be formed. The substrate is then placed in the enclosure where it is supported, by support 30, opposite cathode 28 and approximately in a position which corresponds to the boundary of the "dark" electrical discharge.

A vacuum of about $10^{-7}$ torr is created in the bell to evacuate the air and to outgas the parts; a mixture of argon and nitrogen is admitted while maintaining a vacuum of about $10^{-3}$ torr. The electrical discharge is initiated by closing the switch and applying the high negative voltage of 29 to cathode 28. The particles of niobium removed from the cathode by ion impact combine with nitrogen and are deposited on the walls and on substrate 10. The layer of niobium nitride is grown for a time duration selected experimentally to reach the required thickness. A longer deposition time decreases the resistance of the layer. It is however scarcely possible to obtain a thickness beyond 10,000 Angströms without risk of detachment.

The substrate is then withdrawn and sectioned if it is meant to constitute several sensors. Finally, terminal contact wires 13 and 14 are fixed, for example by thermo-welding, on the zones of the terminal bands 11 and 12 which project from layer 15.

The conditions for the deposition by cathode sputtering are selected in accordance with the characteristics desired for the layer, having regard to the use.

The properties of the layer, and particularly the value $T_o$, depend on the temperature of substrate 10 during formation of the layer and, to a lesser degree, on the composition of the atmosphere in which sputtering takes place and which can reach 100% nitrogen.

Figure 3:
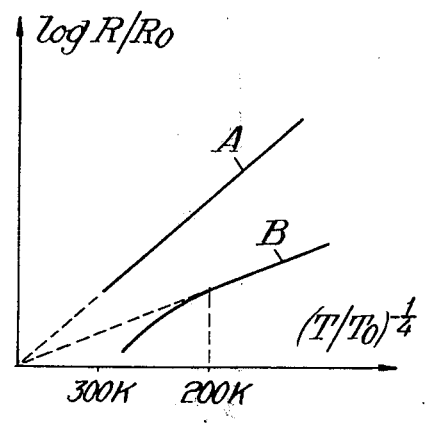
FIG. 3 is a diagram showing curves representing the variation of log $R/R_o$ plotted against $(T/T_o)^{-\frac{1}{4}}$ of two sensors.

The effect of the temperature of substrate 10 during deposition appears in FIG. 3, which shows the variation of the resistance R of two particular sensors as plotted against the temperature of the layer.

The sensor can be given a characteristic of the kind shown by curve A, which corresponds to high sensitivity and to good linearity over a wide range of temperatures, from the boiling temperature of helium up to ambient temperatures, by carrying out the deposition step on a substrate maintained at a low temperature, 150 K for example. To attain this result, support 30 can be cooled by circulation of liquid nitrogen. But, as a counterpart for its high sensitivity and linear response over a wide range of temperatures, the sensor has the disadvantage of a high resistance, particularly at low temperatures. A sensor can for example be obtained whose resistivity varies from about 1 ohm-cm at ambient temperature to a value of $10^4$ ohms-cm near 4.2 K (boiling temperature of helium). The latter value is very high and makes the sensor sensitive to background noise.

Consequently, when the sensor is to be used at low temperature, e.g. below 200 K, it may be preferable to carry out the deposition on a substrate at a higher temperature, so as to obtain a response of the type corresponding to curve B. Then linear variation of log $R/R_o$ in terms of $(T/T_o)^{-\frac{1}{4}}$ is only maintained up to about 200 K and the sensitivity is lower. On the other hand, the resistivity of the layer and consequently the resistance of the sensor are much lower and the sensor is less sensitive to background noise.

This resistance can be reduced still further by carrying out the deposition step with a heat insulating support 30, which allows the temperature of the substrate 20 to rise to a value close to that of the plasma, 500 K for example.

The characteristics of the layer can also be modified by changing the nitrogen content of the atmosphere Increasing the partial pressure of nitrogen increases to some degree the value of $T_o$.

In short, the invention provides a sensor whose resistance may be represented by a simple mathematical function with respect to temperature over a wide range of temperatures, whose resisitivity may be adjusted between about 1 ohm-cm (at the ambient temperature) and about $10^4$ ohms-cm (at 4.2 K), and which may have a small volume and a low thermal inertia.

We claim:

1. A new use for a thin film resistor of a layer of niobium nitride having a disordered structure, comprising placing said resistor in an environment whose temperature is to be measured in a predetermined temperature range while supporting said film by a substrate of a material having a large thermal conductivity and which is electrically insulating within said temperature range to produce a device having a negative temperature coefficient in said temperature range.

2. A method according to claim 1, wherein said layer has a thickness of from 1,000 Angstroms to 10,000 Angstroms.

3. A method according to claim 2, wherein said layer is on a substrate of a material selected from the group consisting of sapphire, beryllium oxide and glass.

4. A method according to claim 2, wherein said layer has ohmic contacts consisting of thin gold layers.

5. Resistive temperature sensor having a negative temperature coefficient and suitable for use at cryogenic temperatures, comprising: a substrate of sapphire coated with a thin strip of niobium nitride deposited under conditions such as it has a disorganized structure and its resistivity R varies with the temperature substantially according to the relation $$R = R_o \exp. (T/T_o)^{-\frac{1}{4}}$$

for temperatures below 200 K, $R_o$ and $T_o$ being predetermined constant values; and ohmic contacts at opposite ends of said strip.

6. Sensor according to claim 5, wherein said layer of niobium nitride is formed by reactive cathodic sputtering.

7. A process for preparation of resistive temperature sensor, comprising the steps of: locating an electrically insulating thermally conducting substrate in a nitrogen containing atmosphere; forming a thin layer of niobium nitride having a disorganized structure on said substrate by reactive cathodic sputtering; and forming ohmic contacts at opposite ends of said layer.

8. A proces according to claim 7, wherein the deposition of niobium nitride is carried out in an atmosphere of argon and nitrogen under low pressure.

9. The method of claim 1, wherein said temperature range comprises cryogenic temperatures.

* * * * *